Patented Nov. 1, 1932

1,885,833

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CONTACT SULPHURIC ACID PROCESS

No Drawing.    Application filed January 22, 1929. Serial No. 334,365.

This invention relates to the contact sulphuric acid process.

In the patent to Jaeger and Bertsch, No. 1,657,754 dated January 31, 1928, and in my prior Patents No. 1,694,123 dated December 4, 1928 and No. 1,675,309 dated June 26, 1928, contact sulphuric acid processes have been described and claimed in which a contact mass is used containing a zeolite in which the catalytically active component is either chemically combined or physically associated. The structure of the base exchange body and its chemical constitution were considered to be essential factors in the success of the process. Surprising as it may seem, I have now found that it is possible to prepare contact masses for the contact sulphuric acid process which contain non-base exchanging silicates or polysilicates of the catalytically active elements. These contact masses are very efficient and although they are not base exchange bodies they appear to share many of the valuable operating characteristics of contact masses which contain zeolites. A very wide field is opened since it is not necessary to form the silicates of the present invention under carefully controlled conditions which result in the production of zeolites. On the contrary, the silicates may be prepared in solutions which are neutral or acid to litmus and many catalytically active elements which are so strongly basic as to be difficultly introduced into the nucleus of zeolites can be effectively used as, of course, they form neutral or polysilicates of non-base exchanging character with ease. This wider field of choice constitutes one of the advantages of the present invention.

The silicates of the present invention may be used in the form of undiluted compounds but the best results are obtained when they are diluted, preferably during formation and at any rate before setting, with diluents of various types, such as, for example, porous material as kieselguhr, pumice meal, glaucosil, and the like with catalytically active material such as impregnated kieselguhr, finely divided catalytically active, silicious or nonsilicious base exchange bodies, and their derivatives, etc. In general the diluents which have been described in the prior patents above referred to may be used with good effect. It should be understood, however, that the present invention is limited to contact masses which when freshly prepared contain at least one silicate having a catalytically active element in chemical combination therewith. It is possible to use any of the known catalytically active metal elements which are capable of forming silicates, such as, for example, metals of the platinum group, metal elements of the fifth and sixth groups of the periodic system, iron, manganese, and the like. Particularly effective are the silicates of vanadium in various stages of oxidation, such as, for example, vanadyl silicate, vanadous silicate, complex non-base exchanging silicates containing vanadium in various stages of oxidation and the like.

The silicates used in the present invention may be prepared in various ways; for example, they may be prepared by the reaction of soluble silicates with one or more metallates or with one or more metal salts or with both metallates and metal salts, the conditions of course being such that zeolites are not formed. The salts and metallates may be simple or complex compounds such as ammonia complexes, cyanogen complexes, etc. In this manner simple silicates may be prepared, an example of which is the reaction between vanadyl sulfate and waterglass or where a plurality of metallates or metal salts or both are used complex silicates are obtained. Thus, for example, the reaction product of waterglass with vanadyl sulfate and aluminum sulfate gives a complex silicate containing both aluminum and tetravalent vanadium. Such a complex silicate is frequently more efficient than is a simple silicate. Complex silicates may also be prepared by the reaction of three types of components, that is to say at least one silicate, at least one metallate and at least one metal salt, under conditions which will not produce a zeolite.

Diluents may be introduced in any of the nine methods described in my prior patent, No. 1,694,123, in connection with zeolite catalysts and I prefer to use diluted silicate contact masses as they are usually more effective than the undiluted in which frequently the concentration of the catalytically active elements is unfavorable for best results.

It should be understood that the elements which are described in my prior Patents No. 1,694,123 and No. 1,675,309 as capable of entering into the formation of the zeolite may be used in forming the non-base exchanging silicates of the present invention and are included therein. The present invention has the additional advantage that many of the elements enumerated in the patents above referred to which are difficult of introduction into the zeolite in non-exchangeable form, requiring in some cases the use of complex compounds, readily form simple or complex non-base exchanging silicates and it is normally not necessary to introduce them in the form of complex compounds. While it is an advantage of the present invention that many such elements can be introduced in a more simple form than in the case of zeolite contact masses, it should be understood that the invention is in no sense limited to the introduction of the elements referred to in the form of simple compounds and, on the contrary, they may be introduced in the form of any of the complex compounds described in the afore-mentioned patents. It is sometimes of advantage to use easily decomposable complex compounds or to introduce diluents which can be readily removed or destroyed either by heating, leaching or other means, as by the introduction of such compounds and their subsequent destruction or removal, additional porosity can be given to the simple or complex silicates which greatly enhances their catalytic effectiveness.

The silicate catalysts of the present invention not only are in many cases more easily prepared than zeolite catalysts and afford a wider choice of elements but they share to a great extent the advantages of zeolite catalysts such as adequate resistance to high temperatures, satisfactory mechanical strength, and the like. Where highly diluted silicate catalysts are used in the present invention, sometimes the amount of silicate is not sufficient to give as great mechanical strength as is desired. In such cases it is frequently desirable to wash the diluted silicate with a dilute solution of a soluble silicate such as water-glass to effect surface silicification which increases the mechanical strength of the contact mass and such after treated contact masses are of course included in the present invention. Compounds of the alkali and alkaline earth metals may also be used to supply additional cementing power and to tone the catalyst.

The simple and complex silicates which constitute the novel catalysts of the present invention in some cases may undergo secondary chemical transformations by reason of preliminary calcination treatment, such as those described in my prior patents above-mentioned which are of course equally applicable to the contact masses of the present invention, or they may be changed in the catalysis itself. Therefore, the catalysts and contact masses of the present invention will be described and claimed as of the time when they are freshly prepared as is usual in catalytic nomenclature.

When the catalytically active components are present both in chemical combination with the silicate and in the diluent, the latter may be siliceous or non-siliceous. Thus, diluents containing finely divided material, such as kieselguhr impregnated with catalytically active components, may be used as described above or base exchange bodies or their derivatives which are catalytically active may be used as diluents. These catalytically active base exchange bodies which are used as diluents of the catalytically active silicates may be two-component or multi-component zeolites or they may be non-siliceous base exchange bodies or acid leached derivatives of zeolites or non-siliceous base exchange bodies. It should be understood that the use of catalytically active base exchange bodies or their derivatives in the contact sulphuric acid process are not claimed broadly in the present invention but form the subject matter of the prior patents referred to above and also of my prior Patent No. 1,675,308, dated June 26, 1928, and copending application Serial No. 290,280, filed July 3, 1928. In the present application the use of catalytically active base exchange bodies is claimed only in combination with the catalytically active non-base exchange silicates which form the main novel feature of the present invention.

In the prior patents which have been referred to the base exchanging silicates and non-siliceous base exchange bodies and their derivatives have been referred to as "permutogenetic bodies", a term which expresses their ability to exchange their bases. The catalysts of the present invention, being prepared by similar methods but having no base exchanging properties, will be referred to in the claims as "non-permutogenetic", since this expresses their relationship to the permutogenetic silicates referred to and at the same time brings out the fact that they do not have base exchange properties.

The invention will be described in greater detail in connection with the following specific examples.

*Example 1*

16 parts of vanadic acid are formed into a slurry with 300 parts of water, acidified with sulphuric acid, heated to gentle boiling, and a stream of sulphur dioxide passed through the hot solution until a blue solution of vanadyl sulphate is obtained. 140 parts of potassium waterglass of 39° Bé. are diluted with 500 parts of water and the vanadyl sulphate solution poured in in a thin stream with vigorous agitation until the reaction mixture is neutral or slightly acid to litmus. The gray-brown reaction product which is separated from the mother liquor by means of a nutsch filter constitutes a vanadyl polysilicate. It is dried, preferably at an elevated temperature, and broken into fragments. If the amount of vanadyl sulphate is not quite sufficient to render the reaction mixture weakly acid to litmus, the necessary amount of an organic or mineral acid, such as acetic acid or hydrochloric acid, is added.

The silicate fragments are filled into a converter and treated for a considerable time with a stream of diluted 3–5% burner gases at 400–500° C., whereby a good contact mass is obtained for the contact sulphuric acid process.

Instead of preparing an undiluted polysilicate, it is preferable and much more economical to use a diluted polysilicate in which the diluents may be inert, activators, or may themselves be catalytically active. A very useful and very cheap diluent is "Celite" earth or "Celite" brick refuse. The diluents may be either introduced into the vanadyl sulphate solution, the waterglass solution, or partly in one and partly in the other. 60–80 parts of "Celite" brick refuse give a very satisfactory diluted contact mass which is highly efficient in the contact sulphuric acid process.

The diluted contact mass is preferably formed into suitable pieces and it is advantageous to mix it before formation with suitable materials having cementing power, such as, for example, calcium oxide or hydroxide, potassium hydroxide, potassium carbonate, potassium sulphate or bisulphate, potassium nitrate, potassium chloride, or other compounds of the alkali metals or alkaline earth metals, the amount of cementing material added being sufficient to endow the formed granules with the necessary strength and to prevent them from dusting. Ordinarily the addition of a weight of cementing material corresponding to 15 to 20% of the weight of the diluted polysilicate will produce the desired result.

The granules of the diluted contact mass are filled into a converter and burner gases or smelter gases containing from 4–9% $SO_2$ and free from dust are passed over the mass at 400–550° C., a conversion of an efficiency of $SO_2$ to $SO_3$ of 96–98.5% being obtained. While the gases should be free from dust, they may contain the well known catalyst poisons for platinum caalysts, such as arsenic and the like.

Equally efficient contact masses may be obtained by a somewhat modified procedure, the vanadyl sulphate being transformed into the coffee-brown potassium vanadite by means of a 10 N. potassium hydroxide solution. The potassium vanadite is then mixed with the waterglass and 2 N. sulphuric acid is gradually introduced with vigorous agitation until the reaction mixture is neutral or acid to litmus. It is advantageous to allow the reaction mixture to react for an hour or two under conditions which are alkaline or neutral to phenolphthalein, the temperature being kept at about 50–60° C. After cooling down, the rest of the sulphuric acid is added to render the reaction mixture neutral or weakly acid to litmus and the reaction mixture is at once separated from the mother liquor by pressing. The dried cake is broken into suitable pieces and is rich in capillaries which increases the catalytic efficiency of the mass.

The "Celite" earth used may, if desired, be impregnated with 5–10% of its weight of salts of the metal acids of the 5th and 6th groups of the periodic system, such as aluminum vanadate, copper vanadate, silver vanadate, aluminate, tungstate, and the like, or instead of using impregnated "Celite" earth catalytically active or inactive zeolites or base exchange bodies or their derivatives may be used, for example base exchange bodies in which the exchangeable bases have been replaced by oxides, such as iron oxide, cobalt oxide, nickel oxide, copper oxide, aluminum oxide, and so on. Base exchange bodies which have reacted with anions such as those contained in sulphuric acid or metal acids of the 5th and 6th groups to form the so-called salt-like bodies, constitute another class of effective diluents. Acid leached catalytically active or inactive base exchange bodies, silicious or non-silicious, are also very effective diluents and can be prepared by treating the base exchange bodies after they have formed and set with dilute acid, such as 2–3% hydrochloric, nitric or sulphuric acid. This results in the removal of part or all of the exchangeable alkali bases and results in diluents which are highly porous and very rich in capillaries, effecting a very desirable increase in the catalytic efficiency of the compositions.

*Example 2*

22 parts of ammonium vanadate are formed into a slurry with 300 parts of water and transformed into the greenish-blue, water-soluble vanadite by passing a vigorous stream of sulphur dioxide through the suspension at 90–100° C. Sufficient 10 N. KOH is then added until the coffee-brown potassium vanadite is obtained, which solution is then mixed with 140 parts of potassium or sodium waterglass of 39° Bé. diluted with 300-400 parts of water. Materials rich in SiO$_2$, such as glaucosil, (the acid-treated residue of greensand), diatomaceous earth, comminuted fragments of natural or artificial silicates either base exchanging or non-base exchanging, non-silicious base exchange bodies or zeolites diluted with materials rich in silica or aluminum oxide are added to the mixture, the amount being from 60-80 parts. To the suspension is then added 20-30% aluminum sulphate solution until the reaction mixture is neutral or acid to litmus. After separating the mother liquor from the cake in the usual manner, it is first dried at 100° C. and is then heated in an air stream to 400-500° C., preferably in the presence of SO$_2$ gases, whereupon it is broken into suitable pieces and is a highly effective contact mass for the contact sulphuric acid process.

The efficiency of the contact mass may be shown by filling 200-300 c. c. of the mass in a tube of 1-1½″ diameter and passing 5-9% SO$_2$ gases over the contact mass at 400-550° C., the temperature being properly controlled and gradually varying in the direction of gas flow from 550 to 400° C. Conversion efficiencies of 96 to 98.5% are readily obtained. If the contact mass fragments do not possess sufficient physical strength, they may be treated with various adhesives before calcining, such as waterglass or compounds of the alkali or alkaline earth metals, the adhesives being added in amounts from 5-15% of the weight of the diluted contact mass. This strengthening may advantageously be effected, for example, by washing the freshly prepared cake with a fairly dilute potassium waterglass solution.

The vanadite component in the contact mass described above may be partly replaced by other metallates and the metal salt components, namely the aluminum sulphate, may be partly or entirely replaced by one or more other metal salt solutions, such as salts of titanium, zirconium, thorium, zinc, cadmium, copper, silver, chromium, iron, cobalt, nickel, cerium, platinum, bismuth, vanadium, etc.

*Example 3*

The following solutions are prepared:
(1) 20 parts of V$_2$O$_5$ are dissolved in 150-200 parts of water containing about 17 parts of 90% KOH.
(2) 6 parts of copper sulphate with 5 mols of water are dissolved in 150-200 parts of water and a concentrated solution of ammonia added until a clear blue solution of the cuprammonium complex is obtained.
(3) 2 parts of aluminum oxide in the freshly prepared form are dissolved in a corresponding amount of 2N.KOH solution to produce potassium aluminate.
(4) 80 parts of potassium waterglass of 33° Bé. are diluted with 2 volumes of water and 10% ammonia is added until the cloudy precipitate obtained at first is again dissolved.
(5) 60 parts of ferric sulphate with 9 mols of water are dissolved in 400 parts of water.

The aluminate and cuprammonium complex solutions are poured together and 80-90 parts of unground infusorial earth are added in order to form a suspension. The vanadate and waterglass solutions are then mixed and added with vigorous agitation and the ferric sulphate solution is poured in in a thin stream. The reaction mixture is then made neutral or slightly acid to litmus, if necessary by means of 2 N. sulphuric acid, and the product obtained is freed from the mother liquor by filtering and pressing, followed by washing with about 300 parts of water in portions. The filter cake is then dried at an elevated temperature, for example at 150° C., and broken into small fragments, constituting a contact mass containing a mixture of complex silicates of vanadium copper, aluminum, and iron, diluted with unground infusorial earth.

The contact mass is filled into a suitable converter, calcined with air at 400-500° C. and is then subjected to a preliminary treatment at about 450° C. with dilute burner gases. After this preliminary treatment the mass is suitable for the contact sulphuric acid process and is used with 6-7% burner gases, the temperature ranging from 500-550° C. in the portions of the contact mass for highest reaction velocity to lower temperatures down to 400° C. in other portions for the best equilibrium.

Instead of using the cuprammonium complex described above, other complex compounds can be used and other metallates may be substituted for the aluminate. The metal salt component may also partly or entirely be replaced by corresponding amounts of other metal salts, especially those of the heavy metals. It is also possible to replace the potassium vanadate with a corresponding amount of potassium vanadite or partly by corresponding amounts of potassium metallates or the metal acids of the 5th and 6th groups of the periodic system, such as tungstate, tantalate, molybdate, and the like.

*Example 4*

6.6 parts of freshly precipitated aluminum oxide are dissolved in N. potassium hydroxide solution in order to form the corresponding potassium aluminate. To this solution diluents rich in SiO$_2$ such as comminuted silicates, quartz, ground rocks, tuffs, lava of volcanic or eruptive origin, natural or artificial zeolites, kieselguhr, "Celite" brick refuse, or the like are added. If "Celite" brick refuse is used, the proper amount is about 80-100 parts. Other suitable diluents are colloidal SiO$_2$ or complex silicic acids obtained by leaching natural or artificial base exchanging silicates with dilute mineral acids in order to remove both the exchangeable bases and the non-exchangeable basic portion of the molecule. In some cases about 5–10% of natural or artificial base exchange bodies leached with dilute mineral acids only to the point of removing part or all of the exchangeable bases may be added. These materials have a very high absorptive power and tone the contact mass for best efficiency. To the aluminate suspension 150 parts of potassium waterglass solution of 33° Bé., diluted with 100 parts of water is quickly added with vigorous agitation and a vanadyl sulphate solution prepared in the usual manner by reducing $V_2O_5$, is added in a thin stream until the reaction mixture becomes neutral or weakly acid to litmus. A dilute gelatinous polysilicate is obtained or a mixture of polysilicates containing aluminum, silicon and $V_2O_5$ in the complex molecule are produced. The mother liquor is removed in the usual way and the cake obtained dried at an elevated temperature and broken into suitable pieces. The order in which the three classes of components are caused to react may be changed at will or the amounts of components may be varied within considerable limits, producing contact masses of similar effectiveness. The aluminum oxide may also be replaced by metallates containing vanadium, tungsten, molybdenum, lead, zinc, or cadmium.

The granules of the contact mass described above are first calcined with air at 400–500° C., then with dilute burner gases containing about 3% $SO_2$. After this treatment 7–8% dust-free burner gases containing poisons for the ordinary platinum contact masses are passed over the mass and a very efficient contact sulphuric acid process sets in at temperatures from 420–550° C. The temperature distribution through the catalyst should be such that a high temperature of 500–550° C. is maintained in the portion of the contact mass which first comes in contact with the concentrated $SO_2$ gases and where the maximum reaction velocity is desired while the later portions of the contact mass are kept at a temperature of 400–420° C. which favors the best reaction equilibrium.

It is sometimes of advantage to add 2–5% of a metal oxide, such as iron oxide, titanium oxide or copper oxide to the diluents described in the examples. This addition appears to enhance the catalytic efficiency of the contact mass as well as its resistance to high temperature.

*Example 5*

6 parts of $V_2O_5$ are transformed into potassium vanadate by means of N. KOH and 150 parts of 33° Bé. potassium waterglass solution diluted with 300 parts of water are added. Thereupon 60–80 parts of unground diatomaceous earth are introduced into the mixture and a solution of 40 parts of aluminum sulphate with 18 mols of water dissolved in 250 parts of water is added in a thin stream with vigorous agitation. After the aluminum sulphate solution is added the reaction mixture must be neutral or alkaline to phenolphthalein. This may be effected by varying the amount of aluminum sulphate used or adding a little N. sulphuric acid. The reaction mixture is then separated from the mother liquor in the usual way, washed with twice the amount of mother liquor obtained, dried and powdered. This is a non-silicious base exchange body and is used as a diluent in a vanadyl silicate by adding the powder to one of the components before reaction. Thus, for example, 6 parts of $V_2O_5$ are suspended in 300 parts of water to form a slurry and acidified with 2–3 parts of concentrated sulphuric acid and then reduced to the blue vanadyl sulphate by means of $SO_2$ gases which are passed into the solution at a boiling temperature. 54 parts of a 33° Bé. waterglass solution diluted with 300 parts of water are mixed with the powdered catalytically active zeolite described in the first paragraph of the example and the suspension is then poured into the vanadyl sulphate solution with vigorous agitation, precipitating out a vanadyl silicate. Care must be taken that after all of the solutions have reacted the resulting mixture must be neutral or acid to litmus, this being brought about, if necessary, with the aid of small amounts of sulphuric acid. The composite mass obtained is calcined at 400° C., first treated with dilute $SO_2$ gases for a short time, and then 7–9% burner gases are passed over at temperatures of 420–500° C., a very efficient contact sulphuric acid process setting in. The ratio of burner gases to contact mass is preferably 1,500 volumes of 7–9% burner gases per hour for 200 volumes of contact mass.

*Example 6*

A mixture of 15 parts of $V_2O_5$ and 4 parts of $WO_3$ are dissolved in 300 parts of KOH containing enough KOH to transform the oxides into the corresponding potassium metallates. About 90 parts of "Celite" earth are stirred into this solution or, if desired, they may be partly or wholly replaced with other diluents as described in the foregoing examples. The suspension is heated to 80–90° C. and is gradually made faintly acid to Congo using 2 N. sulphuric acid. $V_2O_5$ and $WO_3$ are precipitated in the diluent. The mixture is then dried and ground.

40 parts of 33° Bé. potassium waterglass solution are mixed with a solution containing 2 parts of $Al_2O_3$ transformed into the potassium aluminate by the corresponding amount of 5 N. KOH. These two solutions are mixed and immediately after mixture they are kneaded with the impregnated "Celite" earth until the kneaded mixture is neutral to litmus. A mass is obtained containing complex silicates as part of the $V_2O_5$ and the $WO_3$ in their freshly precipitated form react with the waterglass so that a mixture of silicates containing vanadium, aluminum and tungsten is obtained. The wet mass is formed into pieces, which are dried at high temperatures in the presence of gases containing $SO_2$. Thereupon the contact masses are calcined in air and are ready for use in the contact sulphuric acid process where they give high conversion efficiency either with burner or smelter gases.

Example 7

40–50 parts of $SiO_2$ in the form of 33° Bé. sodium or potassium waterglass solution are diluted with 20 volumes of water and mixed with materials rich in $SiO_2$, such as those described in the foregoing examples, until a suspension is obtained which is just stirrable. 18 parts of $V_2O_5$ are dissolved in sufficient 10–20% caustic potash solution so that potassium vanadate is obtained. Another 18 parts of $O_2V_5$ are reduced to the blue vanadyl sulphate by sulphur dioxide in an aqueous suspension acidified with sulphuric acid. About 200–300 parts of water are required, the excess $SO_2$ being removed by boiling. The waterglass and potassium vanadate mixture are then poured together and the vanadyl sulphate solution is permitted to flow in with vigorous agitation, care being taken that the reaction mixture finally becomes neutral to litmus. If necessary the neutrality to litmus can be adjusted by small additions of N. potassium hydroxide or N. sulphuric acid. A dirty green gel is obtained which is filtered with suction, washed with a little water and dried, and constitutes a complex silicate or mixture of silicates containing tetravalent and pentavalent vanadium diluted with materials which are rich in $SiO_2$.

The contact mass is subjected to preliminary treatment as described in the foregoing examples and is then ready for use in the contact sulphuric acid process, giving conversion efficiencies of $SO_2$ to $SO_3$ amounting to 96–98.5%.

The "Celite" earth or other diluent which is incorporated in the waterglass solution may also be impregnated with 3–5% of oxides of iron, nickel, silver, copper, cobalt, aluminum, or other oxides which may be precipitated in the diluent from solutions of their salts by means of dilute alkali. The diluents may also be impregnated with metal vanadates, molybdates, tungstates, chromates or tantalates, especially the heavy metal salts. An impregnation of 3–5% of such metallates gives a very efficient result. The impregnation of the diluent increases the catalytic effectiveness of the complex contact mass as the diluents are at least in part catalytically active.

Example 8

Catalytically active silicates or polysilicates or contact masses containing them as described in the foregoing examples can be coated onto massive carrier fragments of natural or artificial origin, such as, for example, materials rich in silica as quartz fragments, quartz filter stones, sand stones, silica gel fragments, diatomaceous stones, "Celite" bricks, pumice fragments, or fragments of natural or artificial silicates, either base exchanging or non-base exchanging, especially zeolites diluted with materials rich in silica. Other massive carrier bodies may be diluted or undiluted, non-silicious base exchange bodies or their derivatives, unglazed porcelain fragments, metal granules such as aluminum granules or granules of metal alloys such as ferrosilicon, ferrovanadium, ferrochrome, and the like, especially when their surfaces have been roughened. The coating of the massive carriers may take place either after the contact mass has been formed or the contact mass can be caused to react on the carrier fragments and be formed in situ. Thus, for example, the components having alkaline reactions, such as waterglass and metallate solutions, may first be coated onto the carrier fragments and the metal salt components then sprayed on them in quantities sufficient to produce non-base exchanging silicates. If desired, the order in which the components are coated may be reversed.

Instead of using natural massive carrier fragments, artificial fragments may be prepared by forming granules of "Celite", kieselguhr, pulverized quartz, silica gel, pulverized silicates diluted or undiluted, non-silicious base exchange bodies or their derivatives, various adhesives being used, such as waterglass, alkali metal salts, and the like, the granules after formation, of course, being calcined, preferably at 400–500° C., and if desired subjected to subsequent treatment with inorganic acid, such as sulphuric acid, hydrochloric acid, and the like.

Another initial material for the preparation of artificial carrier fragments is for example, greensand pretreated with alkali or waterglass in various ways and then hydrated in order to improve the physical properties of the material, especially its absorptive power. Another voluminous carrier mass can be obtained by treating certain forms of silica, such as diatomaceous earth with lime in the presence of water with or without the use of heat. Other oxides or hydroxides, such as those of strontium, may replace the lime. The product is dried and pulverized, or the wet mass may be calcined or carbonated. By this process a suitable amount of hydrated calcium metasilicate is produced which is a very useful diluent for the preparation of catalytically active silicates or polysilicates and their mixtures for use in the contact sulphuric acid process and is also an excellent material for the preparation of massive carrier fragments used in the contact masses described in the present example.

In order to obtain a good coating on carrier fragments, various adhesives may be used such as, for example, alkaline, neutral, or acid salts of the alkali forming metals as, for instance, sulphates, chlorides, nitrates, waterglass, carbonates, hydroxides and the like. The ratio of catalytically active silicates and polysilicates to the carrier fragments is about 1 kilo of diluted or undiluted silicates to 10 liters of pea size carrier fragments.

Example 9

Pea sized quartz fragments are treated with about a 20% solution of hydrofluoric acid in order to etch the surface of the fragments or, if desired, the quartz fragments may be heated with concentrated potassium hydroxide or with a mixture of concentrated potassium hydroxide and aluminates, such as potassium aluminate, followed by washing free from excess alkali. This treatment has a similar effect to the hydrofluoric acid etching.

These carrier fragments are then coated with the catalytically active silicates described in the foregoing examples, the ratio of coating being 1 part by weight to 10 volumes of carrier fragments.

The catalytically active silicates may be formed on the fragments in situ or the preformed silicates may be pulverized and coated onto the carrier fragments with the aid of adhesive substances, such as small amounts of waterglass, magnesium sulphate, KOH, NaOH, and the like.

A catalytically active silicate body which may be used on the carrier fragments described above is obtained by transforming 2 parts of $Al_2O_3$ into potassium aluminate by means of a N. potassium hydroxide solution, mixing this solution with 40 parts of sodium waterglass diluted with 5 volumes of water, and then pouring in a mixed solution containing 4 parts of chloroplatinic acid in the form of a 2–5% solution and 15 parts of ferric sulphate with 9 mols of water. While the chloroplatinic acid-ferric sulphate solution is being poured in, the reaction mixture should be vigorously agitated and care should be taken that the resulting silicate bodies containing aluminum, $SiO_2$, iron and platinum are neutral to litmus. If necessary, the neutrality may be adjusted in the usual manner. The silicate body is freed from the mother liquor by pressing and washing and is then dried. Instead of preparing an undiluted silicate as described above, a diluted silicate may be prepared containing diluent materials which are rich in silica, such as colloidal $SiO_2$, kieselguhr, and the like. The coating on the fragments is as described in the foregoing examples and where diluted silicates are used there is a notable saving in platinum. After submitting the final contact mass to the usual preliminary treatment with about 3% burner gases at about 450° C., it is transformed into a highly effective platinum contact mass for the contact sulphuric acid process.

Example 10

Another class of effective contact masses is obtained by incorporating catalytically active silicates into catalytically inactive base exchange bodies or their salt-like derivatives, or leached derivatives. The base exchange bodies may be silicious or non-silicious and in the case of the silicious bodies they may be two-component or multi-component. In addition to the catalytically active silicates, the base exchange bodies may also contain catalytically active components. A representative contact mass of this type is prepared by forming 16 parts of vanadic acid into a slurry with 300 parts of water, acidified with sulphuric acid and reducing to the blue vanadyl sulphate in the usual manner. The vanadyl sulphate solution is then divided into two portions in the ratio of 1:2. One-third of the blue solution is cautiously treated with a concentrated caustic potash solution until a coffee-brown potassium vanadite solution is obtained. This is mixed with a solution containing 140 parts of 36° Bé. potassium waterglass solution diluted with 500 parts of water, and the remaining two-thirds of the vanadyl sulphate solution is added in a thin stream with vigorous agitation, the mass first solidifying to a gray-green gel and on further stirring is transformed into readily filterable granular aggregates. Care should be taken that the mixture is neutral or slightly acid to litmus, sufficient diluted sulphuric acid being added to bring this about. The reaction mixture is allowed to stand, decanted, pressed, washed with water, dried and finally ground. Instead of undiluted silicates, a diluted silicate can be prepared using diluent materials, for example materials rich in $SiO_2$.

The contact mass composition described above may be embedded in two-component or multi-component zeolites or in non-silicious base exchange bodies, for example as follows:

90 parts of 33° Bé. potassium waterglass solution are diluted with 4–5 volumes of water and the silicate bodies described are added together with unground infusorial earth, the suspension being vigorously stirred in order to obtain a uniform distribution. The amount of diluents added should be such that the mixture just remains stirrable. 60 parts of aluminum sulphate containing 18 mols of water are dissolved in 200 parts of water and sufficient 20% ammonia is added in order to precipitate the aluminum hydroxide. After freeing it from the mother liquor, it is washed and treated with sufficient 2 N. potassium hydroxide solution to transform it into the corresponding potassium aluminate. The aluminate solution is then poured into the waterglass solution containing the silicate bodies and the mixture is heated up to about 60° C. A gelatinous precipitate is obtained which may be increased by the gradual addition of 2 N. sulphuric acid. The addition of the acid, however, should be stopped at a point where the reaction remains weakly alkaline to phenolphthalein, producing a zeolite. If desired, of course, the amount of acid may be increased until the reaction is neutral or slightly acid to litmus, in which case a non-base exchanging polysilicate is obtained. The gelatinous precipitate is pressed, washed with 200 parts of water in small portions, dried and then broken into fragments. 2–4 volumes of the contact mass thus produced are placed in a contact sulphuric acid converter and 1,000–2,000 volumes per hour of 7–9% burner gases or smelter gases are passed over the contact mass at temperatures ranging from 420 to 550° C., a high percentage conversion of $SO_2$ to $SO_3$ being obtained.

Another contact mass of this type may be obtained by introducing the silicates as diluents into non-silicious base exchange bodies, or vice versa. A diluted non-silicious base exchange body which may be incorporated with catalytically active non-base exchanging silicates is prepared as follows:

10 parts of freshly precipitated $Al_2O_3$ are transformed into potassium aluminate by means of 2 N. potassium hydroxide solution, a 10% excess of alkali being provided. 70–80 parts of "Celite" brick refuse or other comminuted, acid-resistant materials are stirred into the aluminate solution. Thereupon a solution is prepared by dissolving 66.6 parts of aluminum sulphate with 18 parts of water in about 200 parts of water, the aluminum sulphate solution being added to the aluminate solution in small portions with vigorous agitation, and care being taken that the reaction mixture remains strongly alkaline to litmus. The reaction product obtained is freed from the mother liquor, dried at temperatures below 100° C., and pulverized, and constitutes an excellent diluent. If desired, the non-silicious base exchange body may be bleached with acid to remove part or all of the exchangeable alkali or instead of producing a base exchange body the reaction may be permitted to become neutral or slightly acid to litmus, in which case a complex non-base exchanging aluminum oxide is obtained. These diluents may be introduced into the catalytically active silicates as described in the foregoing examples.

Instead of using a non-silicious base exchange body as a diluent, catalytically active silicates may be embedded in it, either during or after its formation.

Another modification consists in hydrating fragments of the non-silicous base exchange body described above and replacing part of the exchangeable alkali by heavy metal oxides, for example by using 5–10% solutions of silver nitrate, ferric sulphate, copper sulphate, etc. After this treatment the base exchange body may be further treated with 5–10% solutions of metallates of the fifth and sixth groups of the periodic system, particularly with soluble vanadate solutions, such as ammonium vanadate and potassium vanadate. A so-called salt-like body of the non-silicious base exchange body is obtained and it is transformed into a catalytically effective catalyst for the contact sulphuric acid process. It is then combined with catalytically active non-base exchanging silicates as described above.

The aluminate component of the non-silicious base exchange body may be replaced partly or wholly by other amphoteric metallates and the aluminum sulphate component may also be partly or wholly replaced by corresponding amounts of one or more solutions of salts, such as those of iron, chromium, nickel, cobalt, manganese, copper, zirconium, thorium, titanium, cadmium or cerium.

Other catalytically active non-silicious base exchange bodies may be combined with the catalytically active silicates of the present invention, such, for example, being vanadyl vanadates and similar complex compounds which are non-silicious base exchange bodies and many of which are described in the literature.

What is claimed as new is:

1. A method of catalytically oxidizing sulphur dioxide to sulphur trioxide, which comprises passing a gaseous mixture containing sulphur dioxide and oxygen at an elevated temperature over a non-permutogenetic contact mass, said mass containing at least one catalytically active silicate.

2. A method of catalytically oxidizing sulphur dioxide to sulphur trioxide, which comprises passing a gaseous mixture containing sulphur dioxide and oxygen at an elevated temperature over a non-permutogenetic contact mass, said mass containing at least one catalytically active diluted silicate.

3. A method of catalytically oxidizing sulphur dioxide to sulphur trioxide, which comprises passing a gaseous mixture containing sulphur dioxide and oxygen at an elevated temperature over a non-permutogenetic contact mass, said mass containing at least one catalytically active poly-silicate.

4. A method of catalytically oxidizing sulphur dioxide to sulphur trioxide, which comprises passing a gaseous mixture containing sulphur dioxide and oxygen at an elevated temperature over a non-permutogenetic contact mass, said mass containing at least one catalytically active diluted polysilicate.

5. A method according to claim 1 in which the silicate contains a metal of the fifth or sixth group of the periodic system in chemical combination therein.

6. A method according to claim 2 in which the silicate contains a metal of the fifth or sixth group of the periodic system in chemical combination therein.

7. A method according to claim 1 in which the silicate contains vanadium.

8. A method according to claim 2 in which the silicate contains vanadium.

9. A method according to claim 3 in which the polysilicate contains vanadium.

10. A method according to claim 4 in which the polysilicate contains vanadium.

11. A method according to claim 1 in which the silicate contains tetravalent vanadium.

12. A method according to claim 2 in which the silicate contains tetravalent vanadium.

13. A method according to claim 2 in which at least part of the diluents are catalytically active.

14. A method according to claim 4 in which at least part of the diluents are catalytically active.

Signed at Pittsburgh, Pennsylvania this 21st day of January, 1929.

ALPHONS O. JAEGER.